Oct. 16, 1962 L. M. KRUGMAN 3,059,185
BATTERY OPERATED APPARATUS INCLUDING A BATTERY
OPERATED CLOCK AND RADIO
Filed May 21, 1959 2 Sheets-Sheet 1
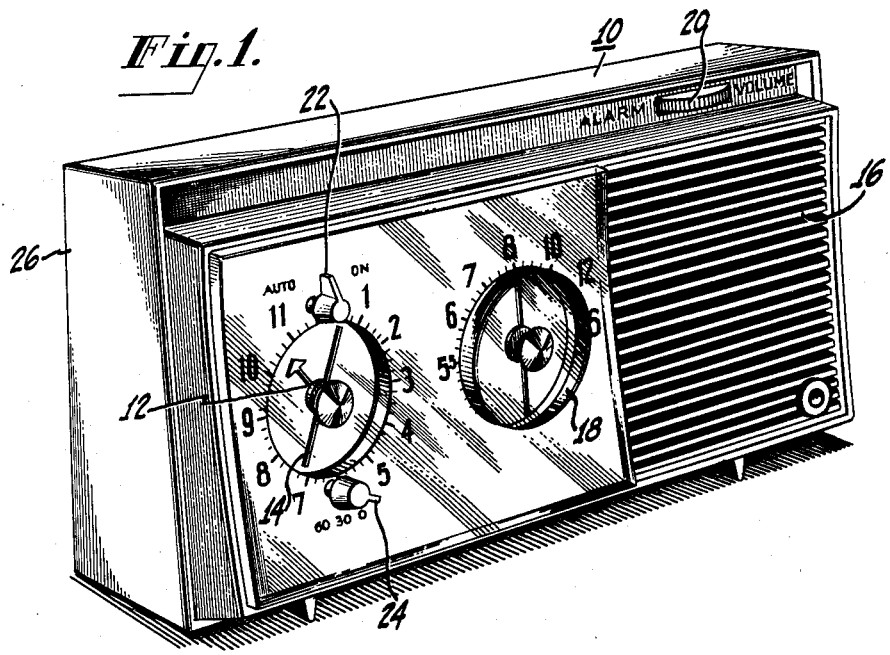
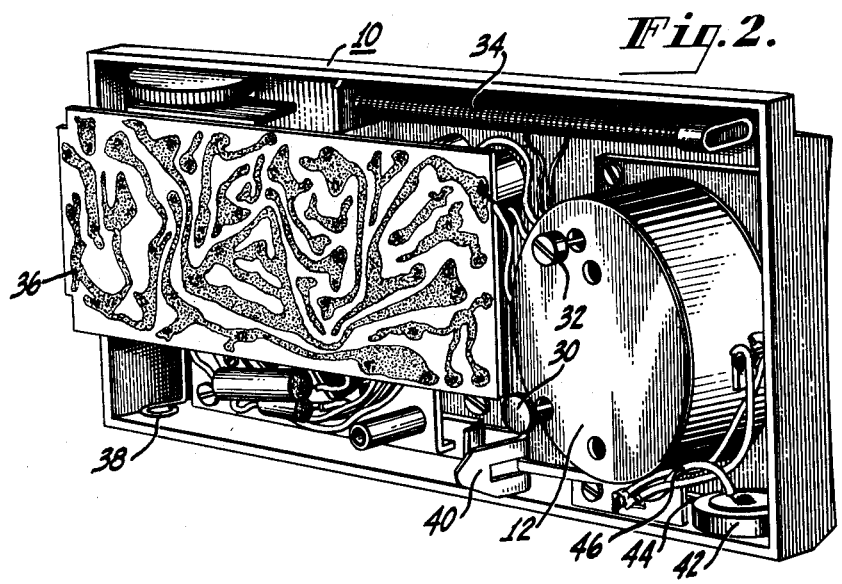
INVENTOR.
LEONARD M. KRUGMAN
BY
*Eugene M. Whitacre*
ATTORNEY Oct. 16, 1962 L. M. KRUGMAN 3,059,185
BATTERY OPERATED APPARATUS INCLUDING A BATTERY
OPERATED CLOCK AND RADIO
Filed May 21, 1959 2 Sheets-Sheet 2

INVENTOR.
LEONARD M. KRUGMAN
BY
Eugene M. Whitacre
ATTORNEY

United States Patent Office 3,059,185
Patented Oct. 16, 1962

1

3,059,185
BATTERY OPERATED APPARATUS INCLUDING A BATTERY OPERATED CLOCK AND RADIO
Leonard M. Krugman, Haddonfield, N.J., assignor to Radio Corporation of America, a corporation of Delaware
Filed May 21, 1959, Ser. No. 814,805
11 Claims. (Cl. 325—396)

This invention relates to circuits for electrically-operated clock mechanisms, and more particularly to battery circuits for direct current operated clocks which may be used with apparatus including a storage battery such as a signal receiver.

The development of transistor technology has led to a commercial trend toward cordless radio broadcast receivers powered by internally contained batteries. These receivers provide a greater versatility in home use and operation than heretofore generally available with power-cord type receivers operated from the power mains. This trend has extended to clock radio receivers, which are automatically controlled by clock-operated mechanism to be energized at preset times for alarm purposes or the like. To adapt such receivers for use with low power drain transistors requires special consideration because of the power drawn by an electrically-powered clock. It is not desirable that the clock be driven directly from the receiver battery because of interference or noise voltages which would be produced in the receiver circuits because of the clock operation. Furthermore, the battery terminal voltage in a transistor radio receiver varies over a wider range than can be tolerated for acceptable time regulation by most commercially available electrically-operated clock mechanisms.

This dictates the use of a separate battery for operation of the clock. A separate battery of sufficient capacity to operate the clock for a reasonable time requires additional space in the receiver cabinet. This is undesirable in that the extra space required offsets the advantage of receiver compactness afforded by the use of transistors. Likewise, if a separate clock battery is used, separate battery holders are required and the receiver cabinet construction should permit access to the clock battery for inspection and replacement. In this regard, it should be noted that a separate clock battery has the disadvantage that after an extended period of use, the terminal voltage thereof decreases, adversely affecting the clock time regulation. Furthermore, the use of a separate clock battery in a radio receiver of this type has the disadvantage that two separate batteries must be maintained, one for the clock and the other for the receiver. Thus, it is possible that shortly after replacement of the receiver battery the clock battery may go dead, thereby preventing the alarm mechanism from operating in the intended manner even though the receiver is otherwise operable.

It is, accordingly, an object of this invention to provide an improved battery system and circuit for an electrically operated clock.

It is another object of this invention to provide a battery-operated transistor radio receiver with an improved electrically-powered clock system wherein the voltage of the battery for the clock is well regulated as long as the receiver battery is sufficiently charged to operate the receiver circuits and wherein the clock operation produces substantially no interference during receiver operation.

It is a further object of this invention to provide an improved clock-operated transistor radio receiver having a clock battery and a main battery for the receiver, wherein special access or mounting means are not required for the clock battery, and only the main battery need be maintained.

2

Another object of this invention is to provide an improved transistor radio receiver of the type including an electrically powered clock, wherein power for clock operation is insured at all times that the receiver battery is operable to energize the receiver circuits, and for an extended period of time thereafter, thereby providing a reference by which the period of time in which the clock will operate may be readily ascertained.

In accordance with an embodiment of the invention, a clock controlled transistor radio receiver includes provisions for receiving a first battery for operating the receiver circuits. A second and rechargeable battery which provides power for operating the clock is permanently mounted in the receiver cabinet. A trickle charging circuit is connected between the receiver battery and the rechargeable battery so that a charging current is delivered to the rechargeable battery to maintain it at substantially full charge so long as the receiver battery is operable to energize the receiver circuits.

Since the clock battery is rechargeable, there is no need for replacement of it, and only a single battery need be maintained by the user. Furthermore, because some of the power for operating the clock is derived from the receiver battery through the charging of the clock battery, the total capacity requirements of the clock battery are reduced thereby permitting this battery to be of small physical size. Thus, a battery may be used which is small enough to be held in position by the conductors connecting it to the power terminals of the clock without the requirement of special battery mounting and holding means. Another advantage afforded by the use of a battery system in accordance with the invention is that the trickle charging current maintains the terminal voltage of the rechargeable clock battery substantially constant, thereby enhancing the time regulation characteristics of the clock. From a design standpoint, the constant supply voltage for the clock permits the specified voltage range over which the clock exhibits acceptable time regulation characteristics to be reduced. This permits greater flexibility in the selection of a suitable clock. Thus, a clock which has relatively low power requirements may be used efficiently even though it might exhibit poor time regulation over wide variations in the voltage applied thereto. As a result, the combined power requirements of the clock-radio combination are reduced, thereby extending the over-all battery life of the receiver-clock combination.

The novel features that are considered characteristic of this invention are set forth with particularity in the appended claims. The invention itself, however, both as to its organization and method of operation, as well as additional objects and advantages thereof, will best be understood from the following description when read in connection with the accomapnying drawings; in which:

FIGURE 1 is a perspective view from the front of a battery-operated clock-controlled transistor radio receiver;

FIGURE 2 is a perspective view of the rear of the radio receiver shown in FIGURE 1 with the rear cover removed to show certain features thereof in accordance with the invention;

Figure 3:
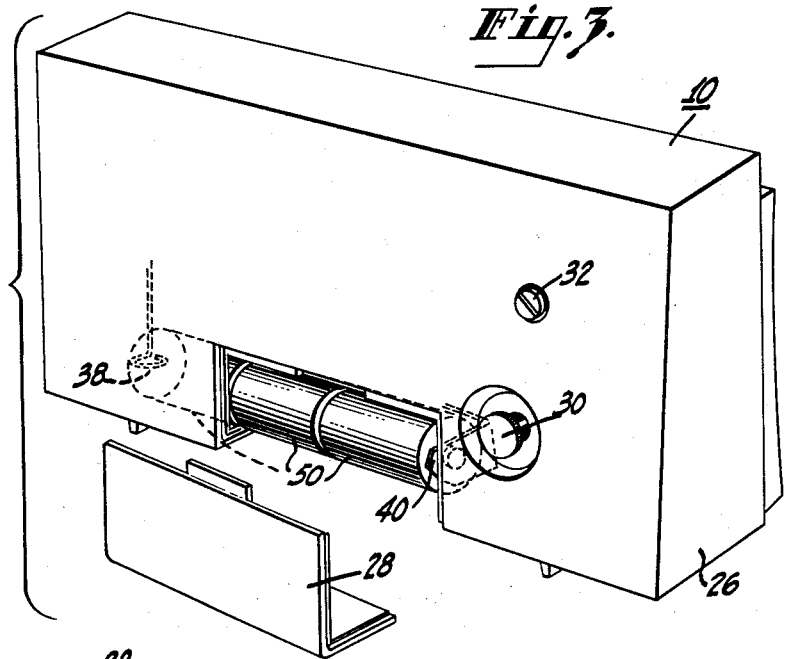
FIGURE 3 is a perspective rear view in outline form, of the radio receiver shown in FIGURES 1 and 2.

Referring now to the drawings, wherein like reference numerals are used to designate similar elements throughout, the clock radio receiver includes a suitably styled cabinet 10, which encloses the receiver circuits and a direct-current powered clock 12. The clock 12 includes a mechanism for controlling a switch 48 connected with the receiver power circuits as is conventional in clock radio receivers. When the receiver controls are properly set, the clock mechanism is operable to close the receiver power circuit at a preselected time as indicated by the alarm indicator hand 14 on the face of the clock. A grillwork 16 is provided at the right end of the cabinet 10 as viewed in FIGURE 1, behind which is located a sound reproducing loudspeaker.

The receiver controls include a tuning control knob 18, a volume-alarm knob 20, a function selector control knob 22 and a slumber control knob 24. The tuning control knob 18 which is rotatably mounted adjacent the face of the clock 12, is mechanically connected to variable tuning elements such as a multi-section capacitor housed within the cabinet 10. A suitable tuning scale may be associated with the tuning control knob on the front panel, as shown, to provide visual indication of the receiver tuning.

The volume-alarm knob 20 is mechanically connected to a volume-control potentiometer, not shown, which is connected in the receiver circuit in a suitable manner so that the setting thereof controls the volume level of sound emanating from the loudspeaker. The volume-alarm knob 20 also controls a switch, which is ganged with the volume control potentiometer in a manner such that the switch is actuated when the knob 20 has been turned toward the right as far as it will go. When the switch is actuated, the audio amplifier stages of the receiver are connected in a regenerative manner to oscillate in the audio frequency range, when power is applied.

The power circuits for the receiver are controlled by the switch 48 which may be operated by either the clock mechanism or the function selector control knob 22 mounted above the clock face. By rotating the control knob 22 clockwise to the "On" position, power is supplied to the receiver circuits, and a desired station may be selected by adjustment of the tuning control knob 18. The sound volume of the selected station can then be set by rotating the volume control knob 20 until the desired volume level is achieved. If the control knob 22 is rotated in a counter-clockwise direction to the "Auto" position, the receiver is set for automatic operation, and is automatically turned on by the clock mechanism at the time indicated by the alarm indicator hand 14. The receiver then translates and reproduces a desired radio signal determined by the setting of the tuning control knob 18 and at a sound output level as set by the volume alarm knob 20. To provide an alarm tone or buzz, rather than a radio program, the control 22 is moved to the "Auto" position, and the volume-alarm knob 20 is set to the "Alarm" position by rotation fully to the right as explained above. Thus, when the receiver is energized at the preset time, the audio amplifier stages oscillate, causing a continuous audible tone or buzz to be reproduced by the loudspeaker.

The clock mechanism is also provided with a slumber control knob 24. This knob is operable to close the switch 48 in the power circuits of the receiver to energize the receiver for a selected short period of time. This selection is accomplished by rotating the slumber control knob 24 in a clockwise direction until it points to the number of minutes that it is desired to have the receiver operative before being automatically turned off. The clock mechanism controls the switch in a known manner so that after the selected period of time the knob 24 is returned to its initial position, causing the switch 48 to open and the receiver circuits to be deenergized.

Referring to FIGURE 3 which is a perspective view of the rear of the clock radio receiver, it will be noted that the back cover 26 has a snap-in closure member 28 which covers a battery receptacle carried on the inner side of the back cover 26. To install batteries in the receiver, the closure member 28 is removed, and batteries are inserted in a manner similar to the loading of a flashlight.

Referring to FIGURE 2 which is a perspective view of the rear of the receiver with the back cover 26 removed, the electrically powered clock 12 is affixed by screws, or the like, to the inside of the front panel of the cabinet 10. The clock includes a control stem 30 for setting the hour and minute hands thereof, and also for setting the alarm hand 14. The latter adjustment can be made by pulling out on the control stem 30, and then rotating. The clock further includes a speed control adjusting screw 32 for enabling faster or slower clock operation.

Also included within the cabinet 10 is a ferrite loop antenna 34 which is connected to known receiver circuits. Most of the components of the receiver circuits including the transistors, coupling transformers, resistors and capacitors, etc. are mounted on the side of a printed circuit panel 36, facing toward the front wall of the cabinet 10. The receiver circuits are energized by a battery system adapted to be connected between a pair of resilient contacts 38 and 40. Although any suitable type of battery may be used, the receiver shown has been designed for use with three "C" cells 50 which are widely available at low cost. The battery contacts 38 and 40 are positioned to extend through apertures in the battery receptacle carried by the back cover 26, so that positive electrical contact is made when the three cells are inserted in the receptacle therefor as shown in FIGURE 3.

The power source for the clock 12 comprises a small rechargeable battery 42 which may be located in any convenient space available in the receiver cabinet. The battery 42 may comprise a nickel cadmium cell which, due to its small size, may be supported by the conductors 44 and 46 which connect it to the clock 12 power terminals. Thus, there is no need for a special battery receptacle and associated contacts. Furthermore, since the battery is rechargeable it is permanently installed in the receiver cabinet, and hence it is not necessary to provide convenient access thereto as is the case with the receiver circuit battery system.

Figure 4:
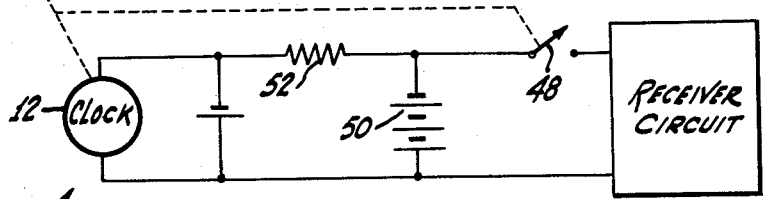
FIGURE 4 is a schematic circuit diagram, partly in block form, of a power supply circuit in accordance with the invention for a battery-operated clock receiver.

The battery circuit connections in accordance with one embodiment of the invention are shown in FIGURE 4. The rechargeable battery 42 is connected between the power terminals of the clock 12. The receiver circuits are connected through a single pole double throw switch 48 to a receiver storage battery 50 which, as mentioned above, may comprise three "C" cells connected in series to provide a higher composite terminal voltage than that of the rechargeable battery 42. The switch 48 is controlled by either the function selector control 22 or the mechanism of the clock 12. For example, when the function selector control knob 22 is moved from the position shown in FIG. 1 to the "On" position, the switch 48 is moved from its open position, as shown in FIG. 4, to its closed position. Likewise, if the function selector control knob 22 is in the "Auto" position of FIG. 1, the switch 48 will be automatically closed by the clock mechanism at a time indicated by the alarm indicator hand 14. With the switch 48 closed, the receiver circuits are energized to translate and reproduce the program of a desired radio station selected by the setting of the tuning control knob 18. If desired, separate power switches may be provided for control by the function selector control 22 and clock mechanism, respectively, or any of a number of switching arrangements may be used as is well known in the clock receiver art.

The receiver battery 50 is also connected to the rechargeable clock battery 42 through a current-limiting resistor 52. The resistor 52 is of a value selected to provide a trickle charging current flow from the receiver battery 50 to the rechargeable battery 42. The charging current is preferably sufficient to maintain the battery 42 at substantially full charge as long as the battery system 50 is operable to energize the receiver circuits. During this time the voltage applied to the clock is extremely well regulated, contributing to the excellence of clock time regulation. After the receiver battery is substantially exhausted, the rechargeable battery 42 is effective to operate the clock for an extended period of time during which the receiver batteries may be replaced. Rechargeable batteries of the nickel-cadmium-cell type exhibit substantially constant terminal voltage over nearly all of the charge cycle, hence providing a constant therminal voltage for the clock even after the receiver battery 50 is exhausted. There is substantially no electrical interference between the clock and the receiver circuits due to the relatively high series resistance of the resistor 52 and low internal impedance of the rechargeable battery 42.

In the specific embodiment of the invention shown in FIGURE 4, the terminal voltage of the rechargeable battery 42 is 1.3 volts, and the terminal voltage of the storage battery 50 comprising the three dry cells, is 4.5 volts. Thus, the terminal voltage of the receiver battery 50 is sufficient to drive a charging current through the rechargeable battery 42, the magnitude of this charging current being set by the value of the resistor 52. When the receiver battery 50 has insufficient charge to properly operate the receiver circuits, a charging current may still be provided. This is because the reduced terminal voltage of the receiver battery 50 then is subjected to less receiver current drain, thereby causing less loading. Therefore, the terminal voltage of the battery stays above that of the rechargeable battery. Furthermore, when the battery 50 is discharged to the extent that the receiving circuits may not be operated, the switch 48 may be thrown to the open position, thereby further decreasing the load, and permitting the terminal voltage to stay above that of the rechargeable battery for extended periods of time.

Figure 5:
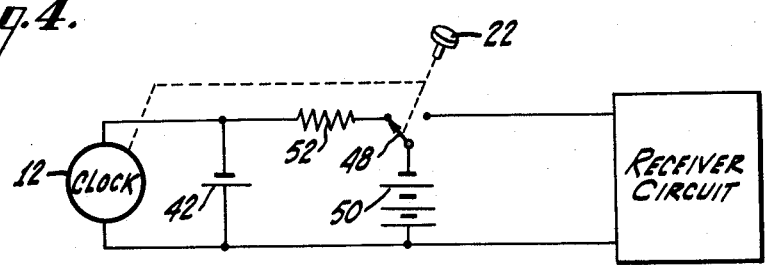
FIGURE 5 is a schematic circuit diagram, partly in block form, illustrating a modification of the power supply circuit shown in FIGURE 4.

If complete isolation between the receiver and clock battery systems is desired, the battery circuit connections may be made in accordance with the schematic circuit diagram of FIGURE 5. In this circuit, the power switch 48 is connected so that the clock battery 42 is not being charged when the receiver circuits are energized, thereby eliminating the charging drain during receiver operation. When the receiver circuits are deenergized, the battery 50 is connected to deliver the trickle charge to the rechargeable battery 42 as described above.

Since a portion of the power for operating the clock 12 is derived from the receiver battery 50, the rechargeable battery 42 may be made extremely small in size. The major capacity requirement of this battery is then determined by the length of time that the clock should operate after the receiver battery 50 is exhausted. In view of the fact that the battery 42 is rechargeable, only the receiver battery systems need be maintained by the user, and there is no danger of the clock battery becoming discharged as long as the receiver is operable.

Although the clock battery system has been described in connection with a signal receiver, it will be understood that the principles of the invention are applicable to other applications where an electric clock is used with apparatus including batteries, such as in automobiles.

As pointed out hereinabove, the relatively constant voltage applied to the clock power terminals not only enhances the time regulation characteristics exhibited by the clock, but also permits greater flexibility in the selection of the type of clock to be used. Specifically, the voltage range over which the clock should exhibit acceptable time regulation is materially reduced with the battery system of the invention as compared to arrangements using an independent clock battery system. Accordingly, a less expensive clock, or alternatively a clock having reduced power requirements may be used. Thus, the combined power requirements of the clock-radio combination are reduced, thereby extending the overall life of a given battery system.

Having described the invention, what is claimed is:

1. In a clock-radio receiver, the combination of battery-operated radio signal receiver means, replaceable battery means for operating said signal receiver means as a power source therefor, an electrically-powered clock, rechargeable battery means of a lower voltage than said first battery means connected directly to and providing a main power source for said clock, means providing a potential-drop-producing charging circuit connected between said first and second named battery means to provide a charging current through said rechargeable battery from said replaceable battery during its useful operating life as a power source for said receiver means, and a power switch connected in circuit between the first battery means and the signal receiver means to control the operation of said receiver means.

2. In a clock-radio receiver, the combination as defined in claim 1, wherein the power switch is connected in circuit exclusive of the charging circuit.

3. In a clock-radio receiver, the combination as defined in claim 1, wherein the power switch is connected in circuit to selectively control the power supply to the signal receiver means and the flow of charging current to the rechargeable battery means from said replaceable battery means alternatively.

4. In a battery-operated clock-radio receiver, the combination of, radio signal receiving and translating means, a replaceable higher-voltage battery for operating said signal receiving and translating means as a power source therefor, an electrically-powered clock, a rechargeable lower-voltage battery connected to provide a main power source for said clock, and means including a series current-limiting resistance element providing a trickle charging circuit connected between said batteries to provide a charging current through said rechargeable battery from said replaceable battery.

5. In a battery-operated clock-radio receiver, the combination as defined in claim 4, wherein the replaceable battery includes a plurality of cells and the rechargeable battery includes a lesser number of cells, whereby the replaceable battery may provide a charging current through the rechargeable battery during its full useful life as the power source for the signal receiving and translating means of the receiver.

6. A battery operated clock-radio receiver comprising in combination, radio signal receiver means, power supply means for said receiver means including a replaceable battery, an electrically-powered clock, power supply means for said clock including a rechargeable battery of lower voltage than said replaceable battery permanently mounted and connected in said receiver, and means including a current control element serially connected between said first and second power supply means to provide a low charging current for said rechargeable battery from said first power supply means.

7. In a battery-operated radio receiver of the type including both signal receiver means and a direct-current-operated clock in a common enclosing casing, the combination comprising, manually-operable selector means including an electrical switch having first and second positions, an externally chargeable receptacle for at least one replaceable battery element, a first power supply circuit connected to include a battery element in said receptacle and said switch in the first position to apply operating current to said signal receiver means from said battery element, a second power supply circuit including said rechargeable battery permanently connected with said direct-current operated clock, and charging circuit means including a series current-limiting element connecting said rechargeable battery across said replaceable battery element when said switch is in its second position.

8. A battery operated clock-radio receiver comprising in combination, a cabinet, radio signal receiver means and a direct-current-operated clock enclosed within said cabinet, means providing a battery receptacle in said cabinet which is accessible exteriorly thereof to facilitate battery removal and installation, contact means positioned to make electrical connection with the terminals of a battery in said receptacle, a power supply circuit connecting said contact means with said signal receiver means to convey operating current thereto, a rechargeable battery permanently mounted in said cabinet apart from said receptacle and connected to said clock to provide operating current therefor, circuit means including a current limiting resistor connecting said rechargeable battery to said contact means to derive a trickle charging current for said rechargeable battery from a battery placed in said receptacle, and switch means in said power supply circuit selectively controllable by said clock for controlling the operating current to said signal receiver means.

9. A battery operated clock-radio receiver as defined in claim 8, wherein the switch means is connected for selectively applying operating current to said receiver means and charging current to said rechargeable battery from said battery in the receptacle.

10. In a battery operated clock-radio, the combination of radio signal receiving means, first battery circuit means for said radio signal receiving means adapted to include at least one replaceable battery, an electrically powered clock, second battery circuit means including a rechargeable battery permanently connected in said clock-radio to provide a power source for said electrically powered clock, and means providing a charging circuit connected between said first and second battery circuit means to provide a charging current through said rechargeable battery from a battery included in said first battery circuit means.

11. A battery operated clock-radio comprising in combination, radio signal receiving means, first battery circuit means for said radio signal receiving means adapted to include at least one replaceable battery, an electrically powered clock, second battery circuit means including a rechargeable battery permanently connected in said clock-radio to provide a power source for said electrically powered clock, and means including a resistor connected between said first and second battery circuit means to provide a charging current for said rechargeable battery from a battery included in said first battery means.

References Cited in the file of this patent

UNITED STATES PATENTS

| | | |
|---|---|---|
| 2,594,988 | Portail | Apr. 29, 1952 |
| 2,651,166 | Dorfman | Sept. 8, 1953 |
| 2,818,543 | Dodge | Dec. 31, 1957 |